W. W. BEARDSLEY.
FRUIT DIPPING MACHINE.
APPLICATION FILED NOV. 28, 1919.
1,373,113.
Patented Mar. 29, 1921.
4 SHEETS—SHEET 1.
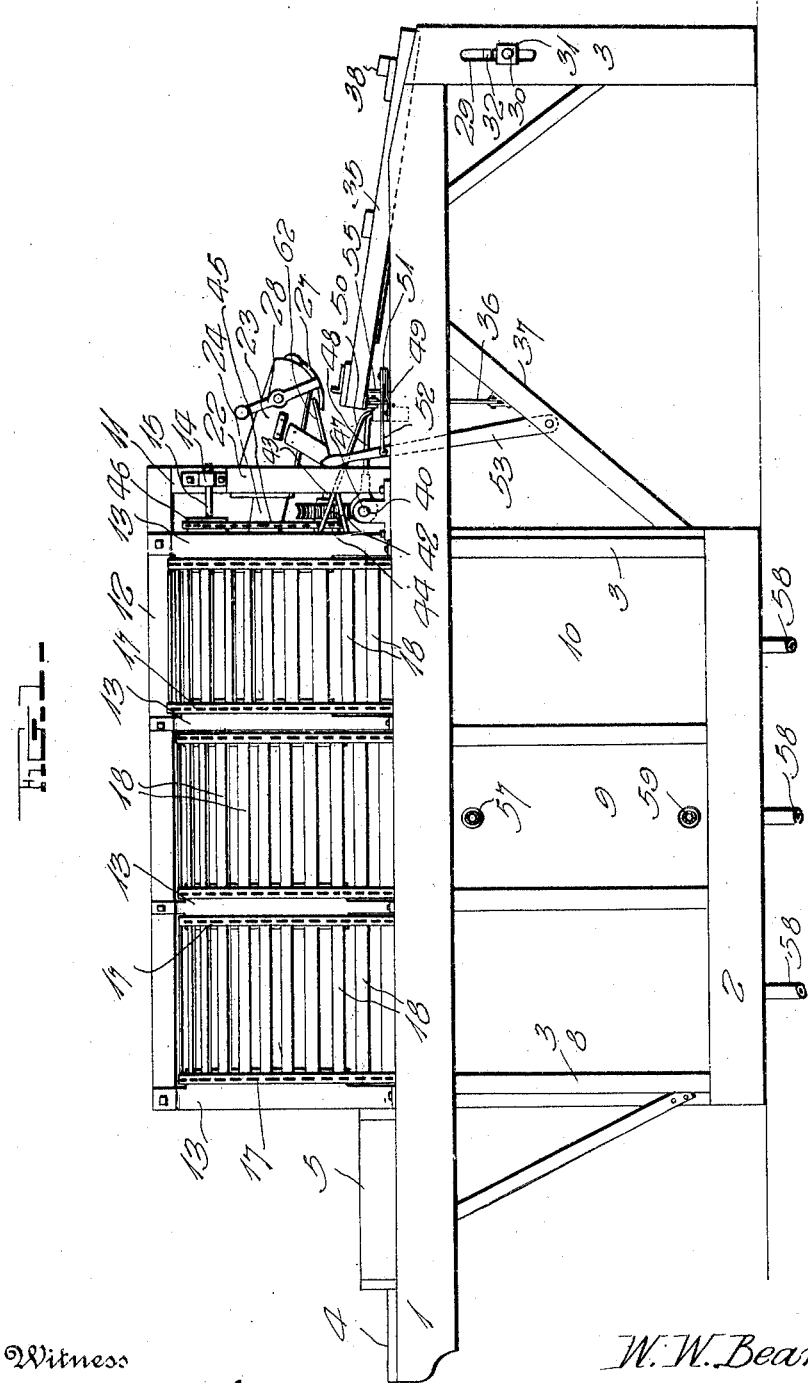
Witness
H. Woodard
Inventor
W. W. Beardsley
By H. B. Wilson & Co.
Attorneys W. W. BEARDSLEY.
FRUIT DIPPING MACHINE.
APPLICATION FILED NOV. 28, 1919.
1,373,113.
Patented Mar. 29, 1921.
4 SHEETS—SHEET 2.
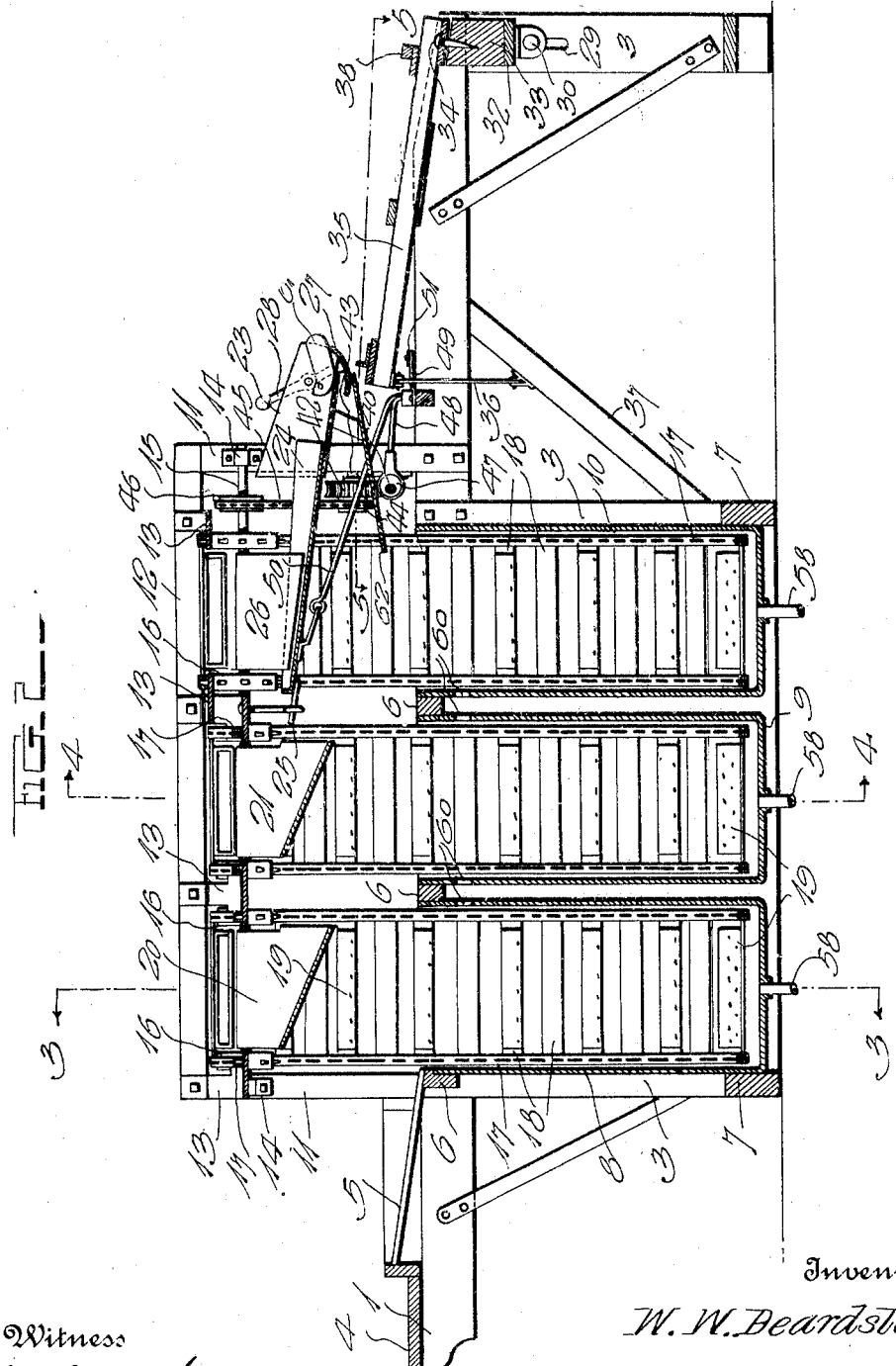
Witness
H. Woodard
Inventor
W. W. Beardsley
By H. B. Willson & Co.
Attorneys W. W. BEARDSLEY.
FRUIT DIPPING MACHINE.
APPLICATION FILED NOV. 28, 1919.
1,373,113.
Patented Mar. 29, 1921.
4 SHEETS—SHEET 3.
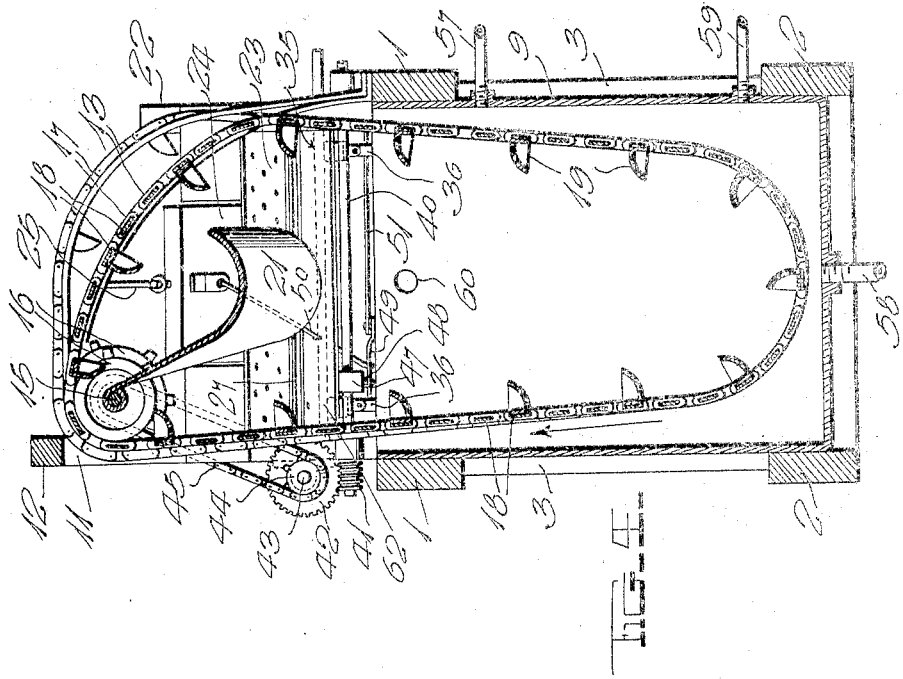
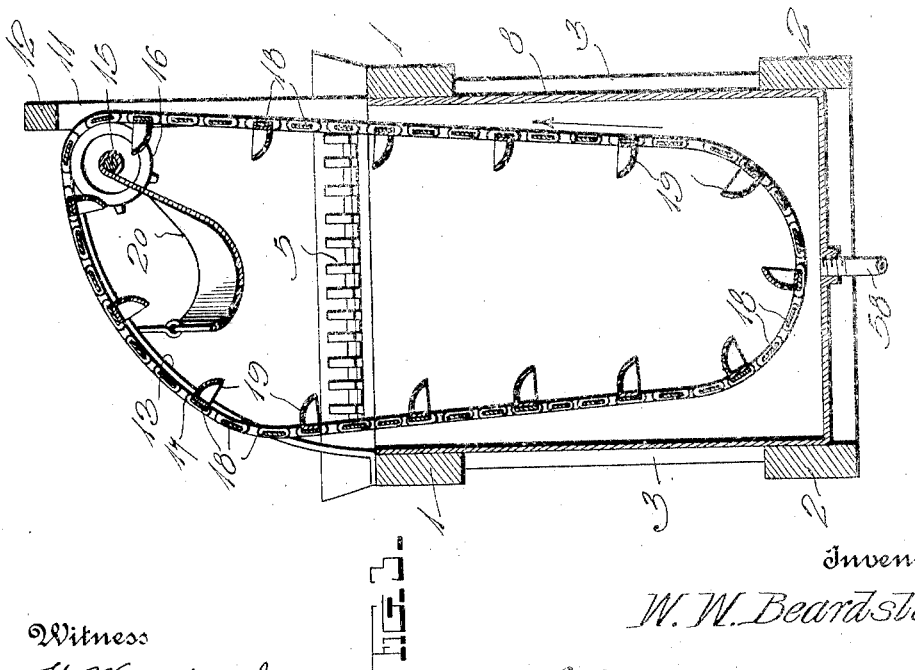
Witness
H. Woodard
Inventor
W. W. Beardsley
By H. B. Wilson & Co.
Attorneys

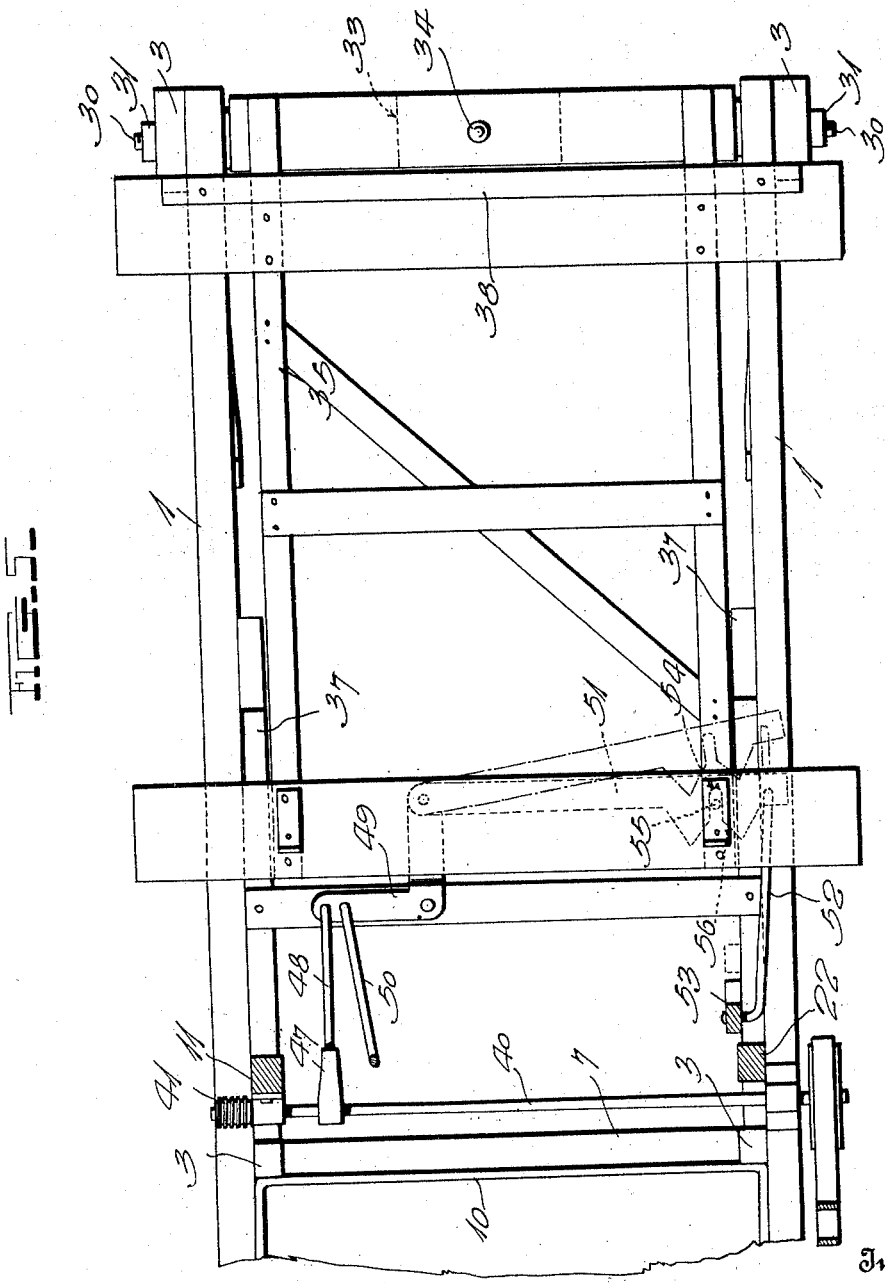

UNITED STATES PATENT OFFICE.

WALTER W. BEARDSLEY, OF SALEM, OREGON.

FRUIT-DIPPING MACHINE.

1,373,113.     Specification of Letters Patent.     Patented Mar. 29, 1921.

Application filed November 28, 1919. Serial No. 340,983.

*To all whom it may concern:*

Be it known that I, WALTER W. BEARDSLEY, a citizen of the United States, residing at Salem, in the county of Marion and State of Oregon, have invented certain new and useful Improvements in Fruit-Dipping Machines; and I do declare the following to be a full, clear, and exact description of the invention, such as will enable others skilled in the art to which it appertains to make and use the same.

This invention relates generally to fruit or vegetable handling machines, but more particularly to machines in which fruit or vegetables are placed to be dipped into tanks of hot and cold water preparatory to canning.

One object of the invention is to provide a machine in which fruit or vegetables are dipped into a series of tanks of hot and cold water and then discharged into a tray which when filled may be replaced by another tray, the machine being so constructed that after the fruit or vegetables are delivered at one end of the machine they will require no attention until they are discharged at the other end thereof. The machine is therefore automatic in so far as the fruit or vegetables are passed from one tank to another and finally passed on to the tray.

Another object of the invention is to provide a fruit or vegetable dipping machine of this character, the various tanks of which are provided with endless aprons which form false bottoms for the tanks and which are provided with means whereby the fruit or vegetables are to some extent agitated within the tanks and lifted out of the same and either discharged into the succeeding tanks or into the aforesaid tray.

A further object of the invention is to generally improve upon machines of this class by the provision of a comparatively simple, strong, durable and inexpensive construction, one which will be efficient and reliable in operation, and well adapted to the purpose for which it is designed.

With these and numerous other objects in view which will become apparent from the following complete description, the invention consists of the novel features of construction, and the combination and arrangement of parts hereinafter fully described and claimed.

In the accompanying drawings forming a part of the specification, and in which similar reference characters designate corresponding parts throughout the several views, Figure 1 is a side elevation of a fruit dipping machine constructed in accordance with this invention;

Fig. 2 is a vertical longitudinal sectional view of the machine;

Figs. 3 and 4 are transverse sectional views of the machine taken on the planes indicated by the lines 3—3 and 4—4 respectively, of Fig. 2 and looking in the direction of the arrows; and, Fig. 5 is a horizontal sectional view of a portion of the rear end of the machine taken substantially on the plane indicated by the line 5—5 of Fig. 2.

The framework of the machine shown in the above briefly described drawings consists of upper longitudinal side bars 1, lower longitudinal side bars 2, upright posts 3, and various parts which will be hereinafter described. The upper bars 1 are considerably longer than the lower bars 2 so that the ends of the former project considerable distances beyond the ends of the latter. At the forward end of the machine the upper bars 1 have secured thereto and support a transverse shelf 4 and a transverse chute 5, the latter being slatted as shown in Fig. 3 and inclining from the forward end of the machine toward the rear end of the same.

Supported between transverse bars 6 extending between the upper longitudinal bars 1 and transverse bars 7 extending between the lower longitudinal bars 2 are tanks 8, 9 and 10. Any number of these tanks may be provided depending upon how many times the fruit or vegetables are desired to be dipped, but for the purpose of illustration only three are shown. The chute 5 discharges into the first tank 8.

Extending above the upper longitudinal bar 1 at one side of the machine are upright posts 11, and disposed between the latter is a longitudinal rail or beam 12. Connected at their upper ends to the inner side of the beam 12 and at their lower ends to the upper edge of the farthermost upper longitudinal bar 1 are curved rails or track ways 13. These rails 13 are longitudinally curved and are disposed across the tanks 8, 9 and 10 adjacent the forward and rear sides of the same. The rails 13 which are disposed adjacent the sides of the tanks 8 and 9 are of less curvature than the rails which are disposed adjacent the sides of the tank 10.

Mounted in bearings 14 carried by the upright posts 11 is a longitudinal shaft 15 carrying three pairs of sprocket wheels 16 disposed adjacent the tracks 13. Passing around these sprocket wheels 16 and running upon the tracks 13 are endless sprocket chains 17, the links of which have secured thereto the ends of slats 18. Each pair of sprocket chains 17 with their slats 18 connected to their links and disposed between them forms an endless conveyer which dips into its respective tank and inasmuch as it is approximately as wide as its tank it forms a false bottom for the same. Certain of the slats 18 carry blades or buckets 19 which extend inwardly and are adapted to gather fruit or vegetables supported by the aprons and raise such articles out of the tanks to be discharged.

Supported in any suitable manner above the tanks 8 and 9 and discharging into the tanks 9 and 10 respectively, are inclined chutes 20 and 21. These chutes 20 and 21 are placed above the tanks 8 and 9 and beneath the rails 13 adjacent the sprocket wheels 16 so that the fruit or vegetables carried upwardly in the buckets 19 of the aprons operating in the tanks 8 and 9 will be discharged into said chutes as the particular links carrying the buckets of these aprons pass around the sprocket wheels.

Supported by the rearmost post 11 and by a post 22 secured to and extending upwardly from the side bar 1 at the side of the machine remote from the posts 11 is an inclined stationary perforated chute 23, the forward end of which supports the rear end of a longitudinally reciprocatory chute 24, the latter having its forward end slidably supported by means 25 suspended from one of the adjacent rails 13 and being disposed above the tank 10. A deflector plate 26 is mounted at one edge upon the shaft 15 and has its other edge extending into the chute 24 so that the fruit or vegetables raised by the apron operating in the tank 10 will be dumped as the buckets of this apron pass around the sprocket wheels 16 and guided by said deflector plate 26 into the chute 24. From the chute 24 the fruit or vegetables will pass into the stationary chute 23. The discharge end of this stationary chute 23 is provided with a closure 27, which carries counterweighted levers 28, whereby said closure is normally maintained in closed position. Pivoted shields 61 aid the fruit in passing onto the tray. A chute 62 disposed below the chute 23 carries the drippage from the latter back into the tank 10.

The upright posts 3 at the rear end of the machine are provided at their upper portions with vertical slots 29 which receive bolts 30 carrying nuts 31, said bolts extending from brackets carried at the ends of a transverse bar 32. The bolts 30 operating in the slots 29 and the nuts 31 provide a means for raising and lowering the bar 32 with respect to the posts 3. The bar 32 carries at its intermediate portion and on its upper side a block 33 to which is swiveled or pivoted on a suitable element 34, the rear end of an inclined frame 35. The forward end of this frame 35 is supported by links 36 carried by braces 37 forming a part of the framework of the machine so that the frame 35 is free to oscillate or shake upon its pivot. The rear end of the frame 35 is provided with an upright ledge 38 to prevent the trays (not shown) which the frame is adapted to support from sliding rearwardly off of the same.

Mounted in suitable bearings 39 and extending transversely across the framework of the machine at a point adjacent the rear side of the tank 10 is a drive shaft 40. At one end of the shaft 40 is fixed a worm 41 which engages a worm wheel 42 carried upon a stub shaft 43 supported by the framework of the machine. Connected to the worm wheel 42 so as to rotate with the same is a sprocket pinion 44 over which passes a sprocket chain 45, which in turn passes over a sprocket pinion 46 carried by the aforementioned shaft 15 so that motion is imparted from the shaft 40 to the shaft 15 and from the latter to the conveyers operating in the various tanks.

Mounted also upon the shaft 40 is an eccentric 47, the rod 48 of which is connected to one arm of a bell crank 49. This arm of the bell crank 49 is connected by a link 50 to the reciprocatory chute 24. The other arm of the bell crank is pivotally connected to one end of a transverse bar 51, the other end of which carries a link 52 connected to an operating handle or lever 53 whereby said bar may be swung to various positions upon which pivot with the bell crank. The last mentioned end of the bar 51 is provided with a considerably deep notch 54 adapted to receive a depending pin or other suitable element 55 carried by an adjacent portion of the frame 35. The outer end of the notch 54 has its side edges flared as at 56 so as to effect a quick and easy engagement of the notch 54 with the pin 55 when the bar 51 is moved toward the pin 55 by swinging the lever 53.

The tanks 8, 9 and 10 are provided with inlet pipes 57 by which water is supplied to the tanks, and drain pipes 58 by which the tanks are drained. The tanks 8 and 10 are supplied with cold water, while the tank 9 is supplied with hot water. In addition to the water inlet pipe 57 in the tank 9, a water outlet pipe 59 has been provided in this tank so that as the water in said tank cools it may be drawn from the same and replaced by hot water. The tanks 8, 9 and 10 are provided with overflow openings 60 whereby the water level is maintained at a predetermined height.

In using the machine the fruit or vegetables are dumped upon the chute 5, the rerectacles in which they are carried to the machine being rested if desired upon the shelf 4. From the chute 5 the fruit or vegetables are discharged into the tank 8, there being supported entirely by the apron disposed in this tank. After the tank 8 is filled or partially filled, the machine is set in operation by applying power to the drive shaft 40. Motion is thereupon transmitted by the means above described to the endless aprons disposed in the tanks 8, 9 and 10 with the result that the fruit or vegetables contained in the tank 8 will be gathered or collected in the buckets 19 and carried or raised out of the tank and discharged into the chute 20 as the portion of the conveyer carrying the buckets passes around the sprocket wheels 16. The chute 20 leads into the tank 9 so that the fruit or vegetables are discharged into this tank where they are to some extent agitated by the motion of the conveyer and then carried out of the tank 9 and discharged into the chute 21. The chute 21 directs the fruit or vegetables into the tank 10 where a similar action takes place, the fruit or vegetables in this case being discharged onto the reciprocating chute 24 and from the latter into the stationary chute 23. The discharge end of the chute 23 is normally closed by means of the closure 27 so that the attendant stationed at this point of the machine operates the closure to cause the fruit or vegetables to be discharged onto the tray (not shown) supported by the shaking or oscillating frame 5. The shaking action of the frame 35 and tray carried by the same causes the fruit or vegetables to pass downwardly toward the rear end of the tray and spread out upon the same. The shaking action also serves to shake the water off of the fruit or vegetables.

The reciprocatory motion of the chute 24 is effected by the rocking action of the bell crank 49 caused by the connection of the latter with the eccentric 47 disposed upon the shaft 40, and the shaking or oscillating motion of the frame 35 is caused by engagement of the bar 51 with the bell crank 49. The bar 51 has what may be termed a clutched connection with the frame 35 whereby by operation of the lever 53, said bar 51 may be moved into and out of engagement with the frame.

From the above it may be seen that the machine is easy to operate as the fruit or vegetables need no attention after they are placed in the chute 5 at the forward end of the machine and until they are discharged into the chute 23. If the fruit or vegetables are continuously fed to the machine they will be continuously discharged from the same.

The tanks 8 and 10 are primarily for the purpose of receiving cold water, and the tank 9 is primarily for the purpose of receiving hot water, but it is to be pointed out that any kind of water may be placed in the tanks, or even chemicals may be placed in the same according to what fruit or vegetables are handled by the machine and what kind of processes they are undergoing.

Various changes in form, proportion, and in the minor details of construction may be resorted to without departing from the spirit of the invention as defined in the appended claims.

What is claimed is:

1. A machine of the class described comprising a tank, means for agitating material in the tank and removing materials from the tank, a chute for receiving material from the material agitating and removing means, a frame for supporting a receptacle for receiving the material from said chute, and means for shaking said chute longitudinally and said frame transversely.

2. A machine of the class described comprising a tank, an endless conveyer operating in and out of said tank, a chute into which said conveyer discharges, a frame for supporting a receptacle for receiving the discharge of said chute, means for driving said conveyer, and means for shaking said chute longitudinally and said frame transversely.

3. A machine of the class described comprising a tank, an endless conveyer operating in and out of said tank, a longitudinally reciprocatory chute into which said conveyer discharges, a frame pivotally mounted at one end for supporting a receptacle for receiving the discharge of said chute, means for driving said conveyer, and means for reciprocating said chute and oscillating said frame.

4. A machine of the class described comprising a tank, an endless conveyer operating in and out of said tank, a longitudinally reciprocatory chute into which said conveyer discharges, a stationary chute into which said reciprocatory chute discharges, a manually operable closure for the discharge end of said stationary chute, a frame for supporting a receptacle for receiving the discharge of said stationary chute, means for driving said conveyer, and means for reciprocating said reciprocatory chute and shaking said frame.

5. A machine of the class described comprising a plurality of tanks, endless aprons suspended above and dipping into said tanks and forming false bottoms for the same, buckets carried by said aprons, chutes supported above said tanks for receiving the discharge of said conveyers, the chutes disposed above the tanks other than the rearmost tanks discharging into the succeeding tanks, a frame for supporting a receptacle for receiving the discharge from the chute of the conveyer of the rearmost tank, and means for driving said conveyers.

6. A machine of the class described comprising a plurality of tanks, endless aprons suspended above and dipping into said tanks and forming false bottoms for the same, a chute leading into the forwardmost tank, a shaking frame for supporting a fruit receptacle mounted at the rear end of the machine, stationary chutes mounted above the tanks other than the rearmost tank for receiving the discharge of the respective conveyers and directing it into the succeeding tanks, a shaking chute disposed above the rearmost tank for receiving the discharge of the conveyer of said rearmost tank and directing it into the receptacle of said shaking frame, means for driving said conveyers, and means for shaking said frame and said shaking chute.

7. A device of the class described comprising a plurality of tanks, a longitudinal shaft mounted above said tanks and provided with sprocket wheels, curved rails disposed transversely above said tanks, pairs of sprocket chains passing over said rails and around said wheels and dipping into said tanks, slats secured to and disposed between the chains of each pair of sprocket chains to form aprons in conjunction with the latter, inwardly extending buckets carried by certain of said slats, chutes into which said buckets discharge, and means for driving said shaft.

8. A machine of the class described comprising a plurality of tanks, endless aprons suspended above and dipping into said tanks and forming false bottoms for the same, a transversely oscillating frame disposed at the rear end of the machine, stationary chutes mounted above the tanks other than the rearmost tank and leading into the succeeding tanks, a longitudinally reciprocatory chute disposed above the rearmost tank and having its discharge disposed above said frame, a transverse drive shaft, means connected to said drive shaft for operating said aprons, a bell crank, an eccentric mounted upon said shaft and connected to said bell crank to operate the latter, and connections between said bell crank and said reciprocatory chute for reciprocating the same and said frame for oscillating the latter.

In testimony whereof I have hereunto set my hand.

WALTER W. BEARDSLEY.